(12) United States Patent
Morris

(10) Patent No.: US 10,320,785 B2
(45) Date of Patent: Jun. 11, 2019

(54) METHOD OF PROTECTING THE IDENTIFYING INFORMATION OF PERSONS AND COMPUTING DEVICES, SPECIFICALLY THOSE DEVICES WHICH ARE CAPABLE OF SENSING, CAPTURING, RECEIVING, TRANSMITTING, PROCESSING AND STORING DIGITAL INFORMATION

(71) Applicant: KnectIQ Inc., Woodbury, MN (US)

(72) Inventor: Kenneth Wayne Morris, Oakdale, MN (US)

(73) Assignee: KnectIQ Inc., Woodbury, MN (US)

( * ) Notice: Subject to any disclaimer, the term of this patent is extended or adjusted under 35 U.S.C. 154(b) by 0 days.

(21) Appl. No.: 15/044,625

(22) Filed: Feb. 16, 2016

(65) Prior Publication Data
US 2017/0237568 A1  Aug. 17, 2017

(51) Int. Cl.
*H04L 9/32* (2006.01)
*G06F 17/30* (2006.01)
*H04L 29/06* (2006.01)
*H04L 9/08* (2006.01)

(52) U.S. Cl.
CPC ........ *H04L 63/0876* (2013.01); *H04L 9/0866* (2013.01); *H04L 9/3239* (2013.01); *H04L 63/0428* (2013.01); *H04L 63/101* (2013.01); *H04L 2209/42* (2013.01)

(58) Field of Classification Search
None
See application file for complete search history.

(56) References Cited

U.S. PATENT DOCUMENTS

| | | | | |
|---|---|---|---|---|
| 7,971,017 | B1 * | 6/2011 | Mann | G06F 21/123 705/51 |
| 9,344,407 | B1 * | 5/2016 | McClintock | H04L 63/0407 |
| 2014/0181892 | A1 * | 6/2014 | Von Bokern | H04L 63/102 726/1 |
| 2015/0278545 | A1 * | 10/2015 | Bigras | H04L 63/0421 726/26 |
| 2016/0080944 | A1 * | 3/2016 | Colegate | H04W 12/08 455/410 |
| 2016/0125416 | A1 * | 5/2016 | Spencer | G06Q 20/1085 705/71 |

* cited by examiner

*Primary Examiner* — Kenny S Lin

(57) ABSTRACT

The present invention relates to the secure identification, authentication, protection and transfer of personal and computing device identifying information between computing devices. Specifically the present invention is a method that removes the need to expose personal or computing device identifying information, while such information is in transit between computing devices.

13 Claims, 4 Drawing Sheets

METHOD OF PROTECTING THE IDENTIFYING INFORMATION OF PERSONS AND COMPUTING DEVICES, SPECIFICALLY THOSE DEVICES WHICH ARE CAPABLE OF SENSING, CAPTURING, RECEIVING, TRANSMITTING, PROCESSING AND STORING DIGITAL INFORMATION

CROSS-REFERENCE TO RELATED APPLICATIONS

This application claims the benefit of U.S. Provisional Application No. 62/116,838 filed Feb. 16, 2015.

STATEMENT REGARDING FEDERALLY SPONSORED RESEARCH OR DEVELOPMENT

The present invention is not related to any federally sponsored research or development.

BACKGROUND OF THE INVENTION

Cybersecurity and more specifically the protection of personal and computing device identifying information has become an individual and nation concern. Data and hardware breaches continue to rise. Identity theft, ransomware, medical device intrusion, cyber-carjacking, energy grid cyberattacks, financial services and banking hacks and theft of medical and health information raise significant concern among individuals, private sector enterprises and government.

Accenture projects cyberattacks will cost the U.S. health system $305 billion over five years. The nascent Internet of Things (IoT), with tremendous potential to benefit society with the collection and analysis of big data, raises significant privacy concerns due to a lack security relative to personal and computing device identifying information contained in, received and transferred by, including but not limited to, wearables, medical devices, connected vehicles and smart home technology.

U.S. trading partners such as the European Union (EU) have expressed deep concern about the lack of robust of U.S. privacy protections related to EU citizens' private identifying data residing on servers and data warehouses in the U.S. The European Court of Justice recently invalidated the Safe Harbor provisions by which U.S. companies are able to move EU citizens' private and identifying information to the U.S. While a new data protection scheme between the U.S. and the EU is being worked out, U.S. companies face uncertain legal risk by continuing to process and move EU citizens' private identifying data to the U.S.

Current approaches to protecting identifying information include software and hardware encryption, including the use of public and private keys; trusted certificate technology; and tokenization. Use of these technologies, when used to harden data security, are effective but the tradeoff is the sub-optimal use and flexibility of the underlying data. Solutions to this problem of balance are often tipped in favor of greater flexibility in data use resulting in less protection for personal or computing device identifying information.

The present invention improves prior art by never exposing personal or computing device identifying information, while such information is in transit from one computing device to another. The present invention de-identifies information prior to transmission and re-identifies information at the destination, safely behind a computing device system of firewalls. The present invention provides a level of protection against dictionary attacks as the unique privacy identifiers are never stored in any database, file or lookup table. The present invention enhances the connective promise of the IoT. Finally, the present invention provides an additional layer of security by complementing prior art such as encryption and tokenization.

BRIEF SUMMARY OF THE INVENTION

The present invention relates to the secure identification, authentication, protection and transfer of personal and computing device identifying information between computing devices. Specifically the present invention is a method that removes the need to expose personal or computing device identifying information, while such information is in transit between computing devices.

In the preferred embodiment of the present invention, a consistent identifier unique to the individual person or computing device is generated for every instance where information or data related to personally identifiable information (PII) or computing device identifying information (CDII) is requested, acquired, stored, analyzed, manipulated, processed, transmitted, data warehoused or shared within and across computer devices.

BRIEF DESCRIPTION OF THE DRAWINGS

These as well as other features of the present invention will become more apparent upon reference to the drawings wherein.

DETAILED DESCRIPTION OF THE INVENTION

The drawings referred to herein are for the purposes of illustrating the various aspects and uses of the present invention and are not meant to the scope of the present invention.

Figure 1:
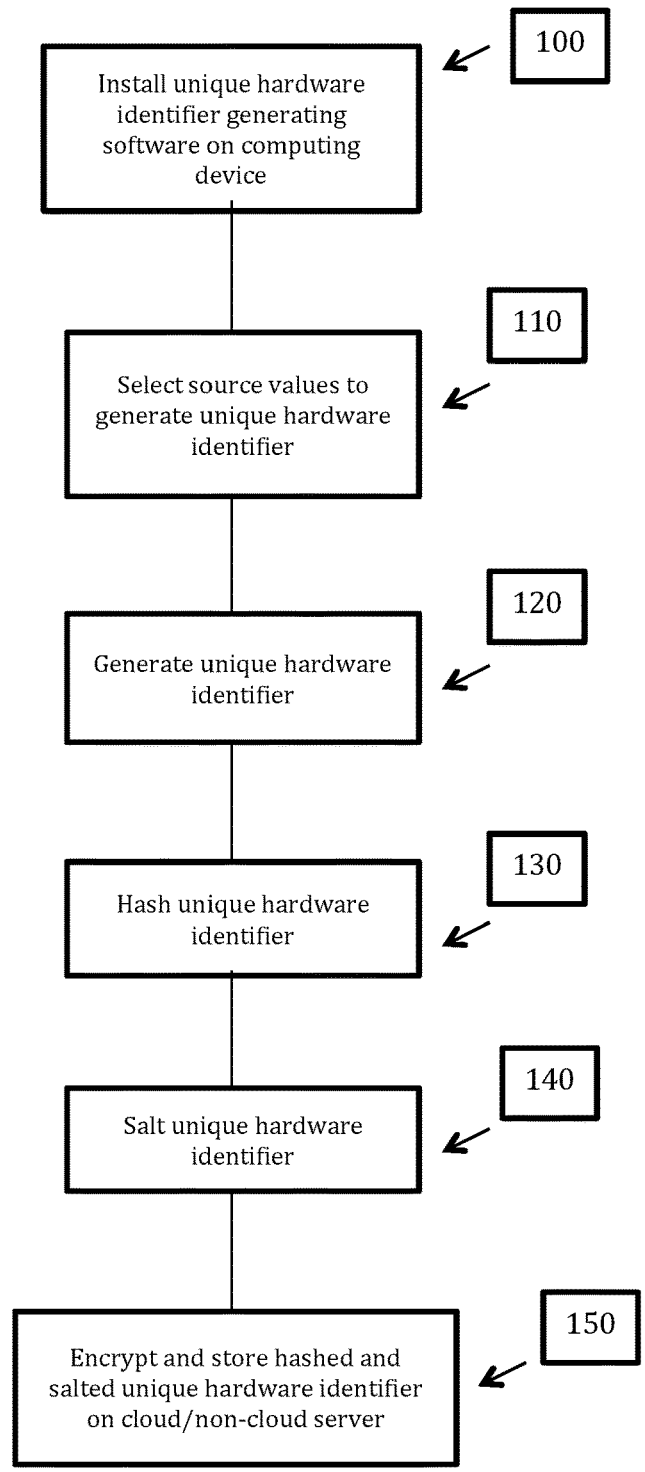
FIG. 1 is a representation of a process of generating a unique hardware identifier.

Referring now to FIG. 1: unique hardware identifier generating software is installed on computing devices, [100]; a computing device selects immutable source identifying hardware values used to a generate unique hardware identifier, [110]; computing device generates a unique hardware identifier, [120]; computing device hashes the unique hardware identifier, [130]; a salt is applied to the hashed unique hardware identifier, [140]; and a computing device encrypts and stores the hashed and salted unique hardware identifier on a cloud or non-cloud server, [150].

Figure 2:
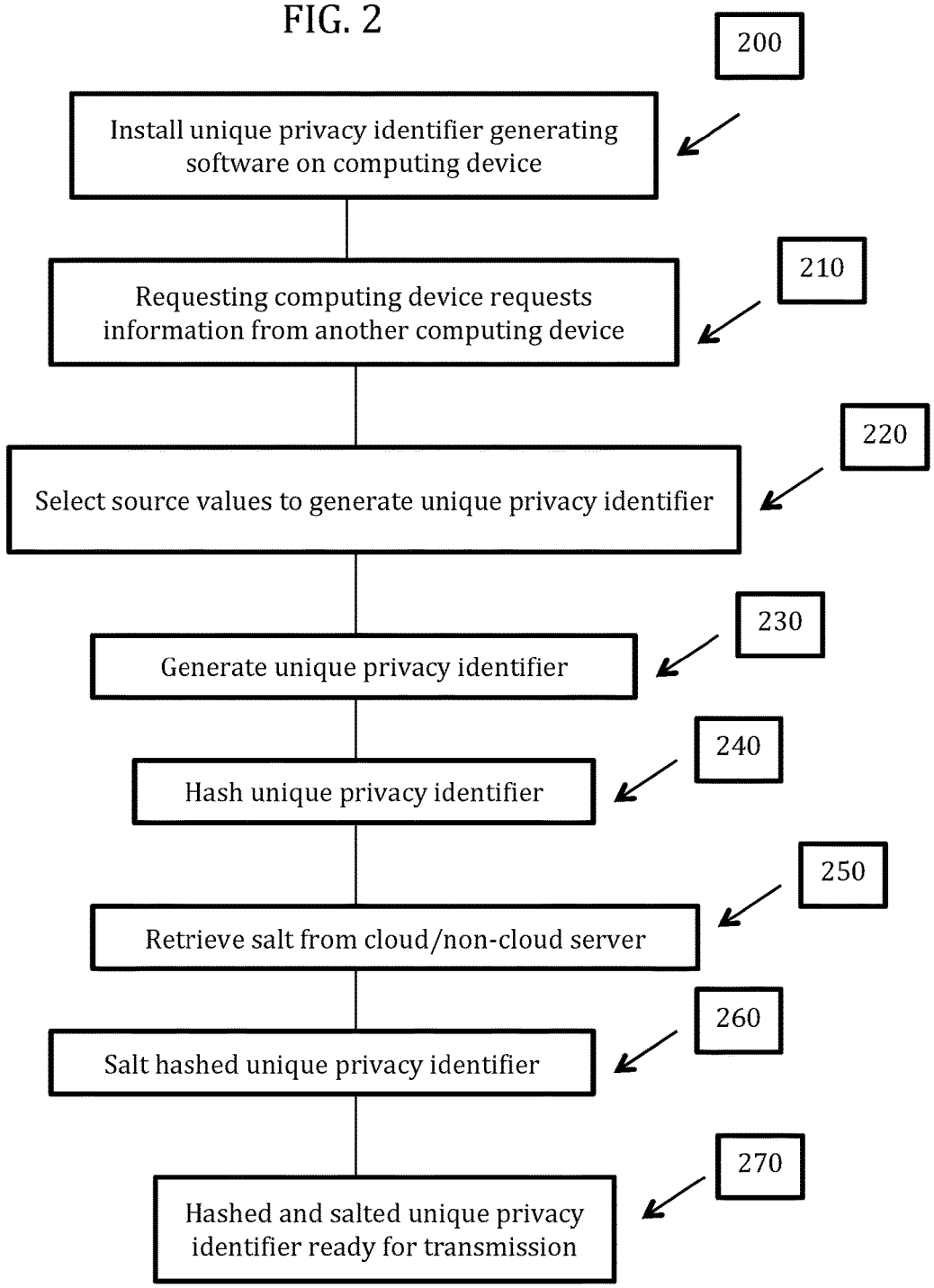
FIG. 2 Is a representation of a process of generating a unique privacy identifier.

Referring now to FIG. 2: install unique privacy identifier generating software on computing devices that will request or receive personal or computing device identifying information, [200]; a requesting computing device requests information from another computing device, [210]; a requesting computing device selects immutable source identifying values from a specific data record or device containing such values, [220]; a requesting computing device generates a unique privacy identifier using the selected immutable source values, [230]; a requesting computing device hashes a unique privacy identifier, [240]; a requesting computing device retrieves salt from a cloud or non-cloud server, [250]; a requesting computing device applies a salt to the unique privacy identifier, [260]; and the hashed and salted unique privacy identifier is prepared for transmission to a requested computing device, [270].

Figure 3:
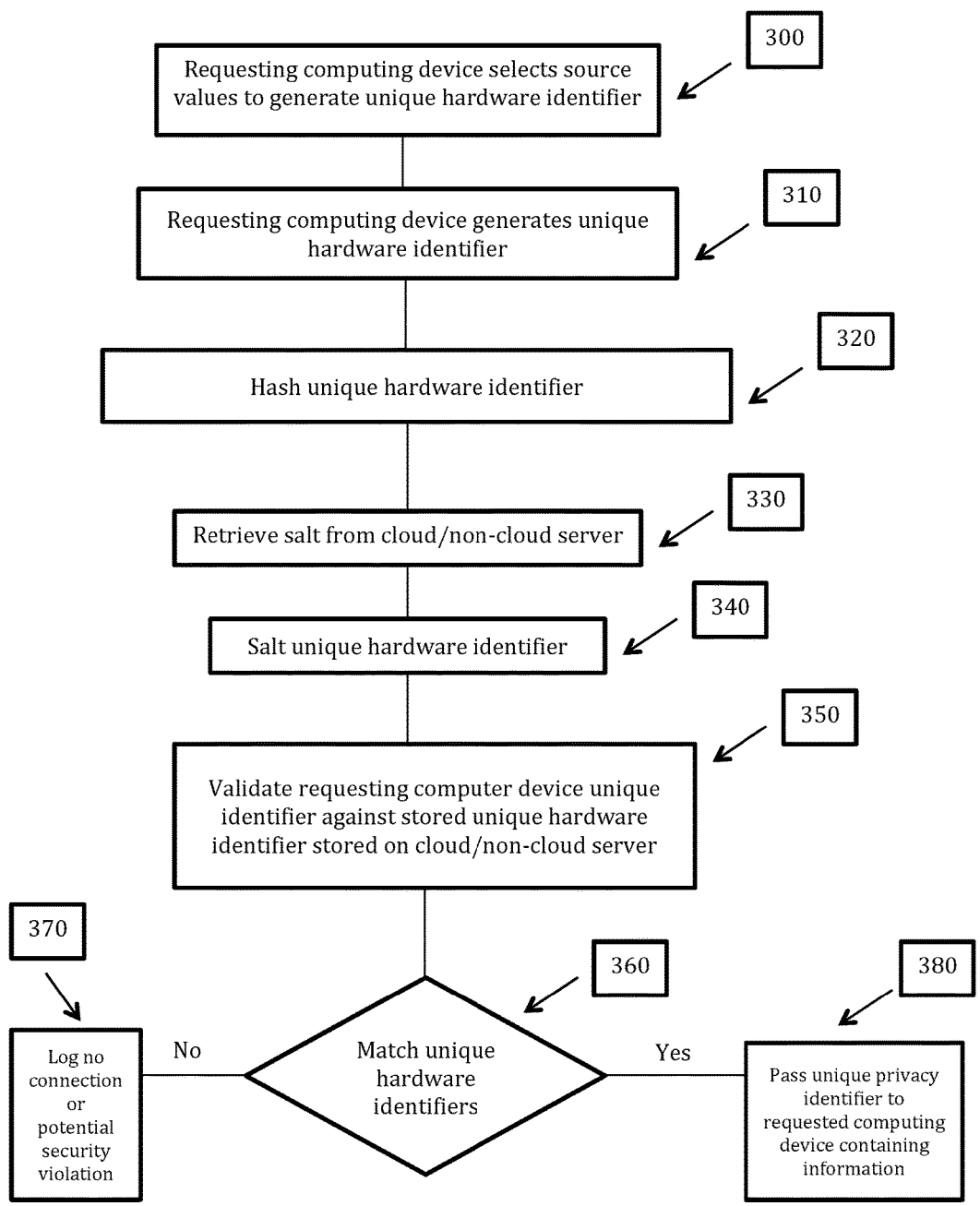
FIG. 3 is a representation of a process of validating and matching a unique hardware identifier.

Referring now to FIG. 3: a requesting computing device selects its immutable source identifying hardware values used to a generate unique hardware identifier, [300]; a requesting computing device generates a unique hardware identifier using the selected source values, [310]; a requesting computing device hashes the unique hardware identifier, [320]; a requesting computing device retrieves a salt from the cloud or non-cloud server, [330]; a requesting computing device applies a salt to its hashed unique hardware identifier, [340]; a requesting computer device validates its generated unique hardware identifier against a unique hardware identifier stored on a cloud or non-cloud server, [350]; a computing device compares the requesting computing device unique hardware identifier with a stored unique hardware identifier, [360]; if the unique hardware identifiers do not match a no connection or possible security violation is logged, [370]; and if the unique hardware identifiers match, the requesting computing device passes its generated unique privacy identifier to a requested computing device containing the requested information, [380].

Figure 4:
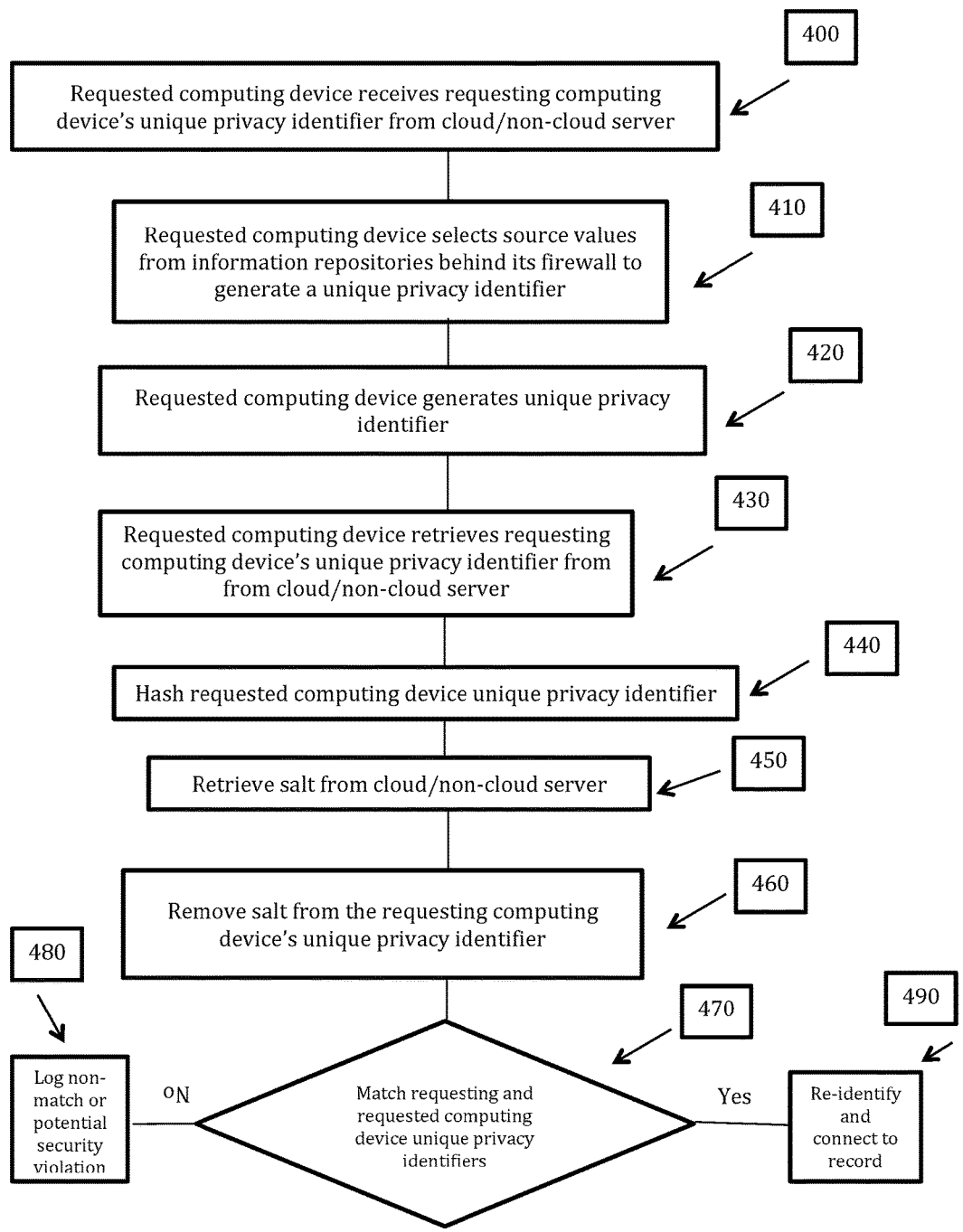
FIG. 4 is a representation of a process of validating and matching a unique privacy identifiers.

Referring now to FIG. 4: a requested computing device receives a unique privacy identifier form a cloud or non-cloud server, [400]; a requested computing device selects immutable identifying values from its information repositories behind the requested computing device's firewall in order to generate a unique privacy number, [410]; a requested computing device generates a unique privacy identifier using the selected immutable source values, [420]; a requested computing device retrieves a requesting computing device's unique privacy identifier from a cloud or non-cloud server, [430]; a requested computing device hashes its generated unique privacy identifier, [440]; a requested computing device retrieves a salt from a cloud or non-cloud server, [450]; a requested computing device removes the salt from the requesting computing device's unique privacy identifier, [460]; a requested computing device compares a requesting computing device's unique privacy identifier with a requested computing device's unique privacy identifier, [470]; if the unique privacy identifiers do not match a no connection or possible security violation is logged, [480]; and if the unique privacy identifiers match, the information is re-identified and connected to the specific identified and matched record, [490].

Additional modifications and improvements of the present invention may be apparent to those of ordinary skill in the art. Thus, the particular combination of steps and processes described and illustrated herein are intended to represent only certain embodiments of the present invention, and are not intended to serve as limitations of alternative methods within the spirit and scope of the invention.

What is claimed is:

1. A method for protecting and securing the privacy of identifying information unique to persons and to computing devices capable of sensing, capturing, receiving, transmitting, processing and storing information comprising:

generating a unique hardware device identifier for a requesting computing device, using specific hardware or firmware identifying data or information as a seed to generate the unique hardware device identifier;

generating a unique salt on an access security broker running on a secure server;

applying a hash and the generated unique salt to the unique hardware device identifier to create a hashed and salted unique hardware device identifier;

storing the hashed and salted unique hardware device identifier in an encrypted registry on the access security broker as a stored hashed and salted unique hardware device identifier;

submitting a data request from the requesting computing device to access information resident on a requested computing device which contains information related to a person or the requesting computing device, the step of submitting including the requesting computing device generating and submitting a request-specific hashed and salted unique hardware device identifier;

generating a requesting computing device hashed and salted unique privacy identifier on the requesting computing device using multiple immutable identifying data or information pertaining to the person or the requesting computing device;

storing, temporarily, the requesting computing device hashed and salted unique privacy identifier on the access security broker;

validating the data request from the requesting computing device by matching the request-specific hashed and salted unique hardware device identifier with the stored hashed and salted unique hardware identifier;

if the request-specific hashed and salted unique hardware device identifier matches the stored hashed and salted unique hardware identifier, passing the requesting computing device hashed and salted unique privacy identifier, to the requested computing device;

deleting the request-specific hashed and salted unique hardware identifier on the requesting computing device;

generating a requested computing device unique privacy identifier on the requested computing device using identifying data or information pertaining to the person or the requesting computing device;

validating, by the requested computing device, the requesting computing device hashed and salted unique privacy identifier by matching the requesting computing device hashed and salted unique privacy identifier with information derived from the requested computing device unique privacy identifier;

if the requesting computing device hashed and salted unique privacy identifier is validated, accessing requested information on the requested computing device pertaining to the data request;

deleting the requesting computing device hashed and salted unique privacy identifier;

if the step of accessing is successful, transferring the requested information, using the above described process, to the requesting computing device; and providing notification to the requesting computing device of completion of the step of transferring the requested information or denial of access.

2. The method of claim 1, further comprising: installing software code programmed to generate the unique hardware identifier on the requesting computing device.

3. The method of claim 1, comprising: installing software code programmed to generate a unique privacy identifier on the requesting and requested computing devices.

4. The method of claim 1, wherein source values for the unique hardware device identifier are selected from the group consisting of CPU ID, MAC, and NODE lock ID.

5. The method of claim 1, wherein source values for the requesting computing device unique privacy identifier are selected from the group consisting of a social security number, date of birth and biometric identifiers.

6. The method of claim 1, wherein the identifying information pertaining to the person is federated across connected and unconnected networks, systems, sub-systems, data repositories, computing devices and chipsets.

7. The method of claim 1, wherein the identifying information pertaining to the requesting computing device is federated, securely, across connected and unconnected networks, systems, sub-systems, data repositories, computing devices and chipsets.

8. The method of claim 1, wherein the method is characterized by secure access control is enabled for machine to machine communication, including computing devices capable of sensing, capturing, receiving, transmitting, processing and storing information.

9. The method of claim 1, wherein the step of generating a requesting computing device hashed and salted unique privacy identifier step further comprises:
   generating a unique privacy identifier on the requesting computing device;
   generating a second unique salt on the access security broker; and
   applying a hash and the second unique generated salt to the unique privacy identifier.

10. The method of claim 1, wherein the step of matching the request-specific hashed and salted unique hardware device identifier with the stored hashed and salted unique hardware device identifier further comprises: comparing the request-specific hashed and salted unique hardware device identifier with the stored hashed and salted unique identifier.

11. The method of claim 1, wherein the step of matching the requesting computing device hashed and salted unique privacy identifier with information derived from the requested computing device unique privacy identifier further comprises:
   applying a hash to the requested computing, device unique privacy identifier to provide a hashed requested computing device unique privacy identifier;
   removing the salt on the requesting computing device hashed and salted unique privacy identifier to provide a hashed requesting computing device unique privacy identifier; and
   comparing the hashed requesting computing device unique privacy identifier with the hashed requested computing device unique privacy identifier.

12. The method of claim 1, wherein the step of validating the data request further comprises:
   decrypting the stored hashed and salted unique hardware device; and
   comparing the decrypted stored hashed and salted unique hardware device identifier with the request-specific unique hardware device identifier.

13. The method of claim 1, wherein the step of generating a requesting computing device unique identifier further comprises: retrieving a salt from the access security broker.

* * * * *

UNITED STATES PATENT AND TRADEMARK OFFICE
CERTIFICATE OF CORRECTION

PATENT NO. : 10,320,785 B2
APPLICATION NO. : 15/044625
DATED : June 11, 2019
INVENTOR(S) : Kenneth Wayne Morris Page 1 of 1

It is certified that error appears in the above-identified patent and that said Letters Patent is hereby corrected as shown below:

On the Title Page

Item (60), add:
--Related U.S. Application Data
Provisional application No. 62/116,838, filed on Feb. 16, 2015.--

Signed and Sealed this
First Day of September, 2020

Andrei Iancu
*Director of the United States Patent and Trademark Office*